US006307763B1

United States Patent
Chavez et al.

(10) Patent No.: US 6,307,763 B1
(45) Date of Patent: *Oct. 23, 2001

(54) TWELVE-PULSE RECTIFIERS INCLUDING SEPARATE SIX-PULSE CONTROLLERS AND METHODS OF CONTROLLING SAME

(75) Inventors: Miguel E. Chavez, Raleigh; Fred Tassitino, Wake Forest; John G. Tracy, Raleigh, all of NC (US)

(73) Assignee: Powerware Corporation, Raleigh, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/467,655

(22) Filed: Dec. 20, 1999

(51) Int. Cl.[7] ................................................ H02M 7/00
(52) U.S. Cl. ............................................................ 363/70
(58) Field of Search .................................. 363/70, 69, 65, 363/84, 87, 89, 125, 127, 129

(56) References Cited

U.S. PATENT DOCUMENTS

| | | | |
|---|---|---|---|
| 4,164,013 | 8/1979 | Kaufhold | 363/45 |
| 4,451,773 | * 5/1984 | Papathomas et al. | 320/59 |

(List continued on next page.)

OTHER PUBLICATIONS

Bourbeau, "Twelve–Pulse Converter With Auto–Balance and Integrated Magnetics Cuts THD," PCIM, Nov. 199, p. 94.

(List continued on next page.)

Primary Examiner—Peter S. Wong
Assistant Examiner—Gary L. Laxton
(74) Attorney, Agent, or Firm—Myers Bigel Sibley & Sajovec

(57) ABSTRACT

Twelve-pulse rectifiers include a first controller that controls a first six-pulse rectifier, a second controller that controls a second six-pulse rectifier and a data network that couples the first controller and the second controller to exchange data therebetween. The first and second controllers preferably have a common architecture and preferably operate independently. Each controller preferably controls its associated six-pulse rectifier as a function of the current and/or voltage output of the associated six-pulse rectifier, preferably using conventional feedback control techniques. Moreover, the first controller also preferably controls the first six-pulse rectifier as a function of a second current at the second six-pulse rectifier output, and the second controller preferably controls the second six-pulse rectifier as a function of a first current at the first six-pulse rectifier output. Thus, each six-pulse rectifier may be controlled as a function of the current at the other six-pulse rectifier output. The first controller preferably receives second data representing the second current at the second six-pulse rectifier output via the data network, and the second controller preferably receives first data representing a first current at the first six-pulse rectifier output via the data network. The first controller preferably continues to control the first six-pulse rectifier upon failure of the second controller to thereby provide a first output current from the first six-pulse rectifier at the twelve-pulse rectifier output. Similarly, the second controller preferably continues to control the second six-pulse rectifier upon failure of the first controller to thereby provide a second output current from the second six-pulse rectifier at the twelve-pulse rectifier output. When the first and second controllers are operational, the first and second six-pulse rectifiers may be controlled by their respective first and second controllers.

41 Claims, 3 Drawing Sheets

U.S. PATENT DOCUMENTS

| | | | |
|---|---|---|---|
| 4,598,352 | | 7/1986 | Narvhus et al. ........................ 363/69 |
| 5,796,601 | | 8/1998 | Yamamoto ............................. 363/84 |
| 5,886,888 | | 3/1999 | Akamatsu et al. ..................... 363/65 |
| 5,903,066 | | 5/1999 | Enjeti et al. ........................ 307/105 |
| 5,956,244 | * | 9/1999 | Rehm et al. ............................ 363/70 |
| 5,963,441 | | 10/1999 | Gibbs et al. ............................ 363/87 |

OTHER PUBLICATIONS

DiJoseph, "Fault Tolerant Power Supply System Uses the Droop Method of Current Sharing," URL http://pcim.com/article/1997/art0017.art1.htm, 2–part article, Copyright Jan. 1998.

Rashid et al., "Analysis of Forced Commutated Techniques for AC–DC Converters," Power Electronics & Applications, Proceedings Vol. I, Brussels, Oct. 16–18, 1985, pp. 2.263–2.266.

Rashid et al., "Analysis of 3–Phase AC–DC Converters Under Unbalanced Supply Conditions," Conference Record, Industry Applications Society, IEEE–IAS–1985 Annual Meeting, Toronto, Canada, Oct. 6–11, 1985, pp. 1190–1194.

Sen, "Evaluation of Control Schemes for Thyristor–Controlled DC Motors," IEEE Transactions on Industrial Electronics and Control Instrumentation, vol. IECI–25, No. 3, Aug. 1978, pp. 247–255.

CAN Specification, Version 2.0, Robert Bosch GmbH, Sep. 1991.

International Search Report, PCT/US00/30047, Mar. 12, 2001.

* cited by examiner

TWELVE-PULSE RECTIFIERS INCLUDING SEPARATE SIX-PULSE CONTROLLERS AND METHODS OF CONTROLLING SAME

FIELD OF THE INVENTION

This invention relates to rectifier systems and methods, and more particularly to twelve-pulse rectifier systems and methods.

BACKGROUND OF THE INVENTION

Twelve-pulse rectifiers are widely used to convert alternating current (AC) to direct current (DC). Twelve-pulse rectifiers can draw AC input current with low Total Harmonic Distortion (THD). As is well known to those having skill in the art, a twelve-pulse rectifier generally is produced by coupling the outputs of two six-pulse rectifiers. The two six-pulse rectifiers may be connected via Y-Δ and Y—Y isolation transformers that are 30 degrees out-of-phase. Each six-pulse rectifier may include a rectifier bridge that is arranged in a secondary circuit of a 3-phase transformer.

The design and operation of six- and twelve-pulse rectifiers are described in the following publications: P. C. Sen, *Evaluation of Control Schemes for Thyristor-Controlled DC Motors*, IEEE Transactions on Industrial Electronics and Control Instrumentation, Vol. IECI125, No. 3, August, 1978, pp. 247–255; M. H. Rashid and M. Aboudina, *Analysis of Forced-Commutated Techniques for AC-DC Converters*, First European Conference on Power Electronics and Applications, Brussels, Oct. 16–18, 1985, pp. 2.263–2.266; and M. H. Rashid and A. J. Maswood, *Analysis of 3-Phase AC-DC Converters Under Unbalanced Supply Conditions*, IEEE Industry Applications Conference Record, 1985, pp. 1190–1194. The design and operation of six- and twelve-pulse rectifiers also are described in U.S. Pat. No. 4,164,013 to Kaufhold entitled Six-Pulse Rectifier Circuit and U.S. Pat. No. 5,903,066 to Enjeti entitled Active Interphase Reactor for 12-Pulse Rectifier, respectively. Accordingly, the design and operation of six- and twelve-pulse rectifiers need not be described in detail herein.

Twelve-pulse rectifiers also generally include a controller that controls the operation of the twelve-pulse rectifier. The controller also preferably controls the current balance between the two six-pulse rectifiers so that the difference between the currents in the first and second six-pulse rectifiers may be controlled and preferably minimized. For example, as described in a publication entitled *Twelve-Pulse Converter With Auto-Balance and Integrated Magnetics Cuts THD* by Bourbeau, PCIM November 1999, pg. 94, a controller with an "auto-balance" feature can reduce the difference in the two currents to typically 10 percent or less of the total DC output current.

Other controllers may provide load-sharing between the 30 degree out-of-phase transformers that constitute the twelve-pulse rectifier using "droop control". See, for example, the publication entitled *Fault Tolerant Power Supply System Uses the Droop Method of Current Sharing* by Frank DiJoseph, PCIM Magazine, 1998. Load sharing between two 30 degree out-of-phase transformers also may be achieved using analog signal comparison.

Unfortunately, the controller may be a source of reliability problems for twelve-pulse rectifiers because the twelve-pulse rectifier generally ceases to operate upon failure of the controller. Moreover, conventional controllers may not be able to balance the currents between the two six-pulse rectifiers sufficiently to reduce the input current total harmonic distortion as desired for high performance applications.

SUMMARY OF THE INVENTION

The present invention can provide rectifier systems including a first controller that controls a first six-pulse rectifier, a second controller that controls a second six-pulse rectifier and a data network that couples the first controller and the second controller to exchange data therebetween. The first and second controllers preferably have a common architecture and preferably operate independently. In other words, they preferably do not operate in a master-slave relationship. By providing the first and second controllers that communicate via a data network, failure of one controller can allow a load to be supported by the other controller and its associated six-pulse rectifier to thereby improve reliability. Moreover, digital controllers that communicate over a data network can accurately control the load balancing between the six-pulse rectifiers, for example, within one percent or less, to thereby allow low distortion AC input current to be drawn for high performance applications.

Preferred embodiments of rectifier systems according to the present invention comprise a first six-pulse rectifier including a first six-pulse rectifier output and a second six-pulse rectifier including a second six-pulse rectifier output. The first and second six-pulse rectifier outputs are coupled together to provide a twelve-pulse rectifier output. A first controller controls the first six-pulse rectifier. A second controller controls the second six-pulse rectifier. A data network couples the first controller and the second controller. The first and second controllers preferably have the same architecture and more preferably are identical. They preferably are separate from one another and preferably operate independently, rather than in a master-slave relationship.

Each controller preferably controls its associated six-pulse rectifier as a function of the current and/or voltage output of the associated six-pulse rectifier, preferably using conventional feedback control techniques. Moreover, the first controller also preferably controls the first six-pulse rectifier as a function of a second current at the second six-pulse rectifier output, and the second controller preferably controls the second six-pulse rectifier as a function of a first current at the first six-pulse rectifier output. Thus, each six-pulse rectifier may be controlled as a function of the current at the other six-pulse rectifier output. The first controller preferably receives second data representing the second current at the second six-pulse rectifier output via the data network, and the second controller preferably receives first data representing a first current at the first six-pulse rectifier output via the data network.

More specifically, the first controller preferably comprises a first feedback loop that controls the first six-pulse rectifier as a function of the voltage and/or current at the first six-pulse rectifier output and independent of the second six-pulse rectifier output, and a second feedback loop that also controls the first six-pulse rectifier as a function of the current at the second six-pulse rectifier output. Similarly, the second controller preferably comprises a first feedback loop that controls the second six-pulse rectifier as a function of the voltage and/or current at the second six-pulse rectifier output and independent of the first six-pulse rectifier output, and a second feedback loop that also controls the second six-pulse rectifier as a function of current at the first six-pulse rectifier output. Analog and/or digital feedback control loops may be used.

By providing separate first and second controllers, improved reliability of the twelve-pulse rectifier may be obtained. In particular, the first controller preferably continues to control the first six-pulse rectifier upon failure of the second controller to thereby provide a first output current from the first six-pulse rectifier at the twelve-pulse rectifier output. Similarly, the second controller preferably continues to control the second six-pulse rectifier upon failure of the first controller to thereby provide a second output current from the second six-pulse rectifier at the twelve-pulse rectifier output. When the first and second controllers are operational, the first and second six-pulse rectifiers may be controlled by their respective first and second controllers. As was described above, the first six-pulse rectifier may be controlled by the first controller as a function of the second current at the output of the second six-pulse rectifier output, and the second six-pulse rectifier may be controlled by the second controller as a function of a first current at the output of the first six-pulse rectifier.

Accordingly, respective first and second six-pulse rectifiers of a rectifier system may be controlled by respective first and second controllers that are separate from one another and preferably operate independently from one another. Since failure of one controller can allow the load to be supported by the other controller, the rectifier can be made redundant for improved reliability. Moreover, by using a digital data network to exchange messages between the controllers, a high degree of balance between the six-pulse rectifiers may be obtained to thereby allow low distortion DC to be produced for high performance applications.

It will be understood that although the invention is described in terms of coupling two six-pulse rectifiers, more than two six-pulse rectifiers may be coupled to provide, for example, 18-pulse, 24-pulse etc. rectifier systems. Moreover, although six-pulse rectifiers are described, fewer or larger pulse rectifiers, such as single-pulse rectifiers also may be coupled.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
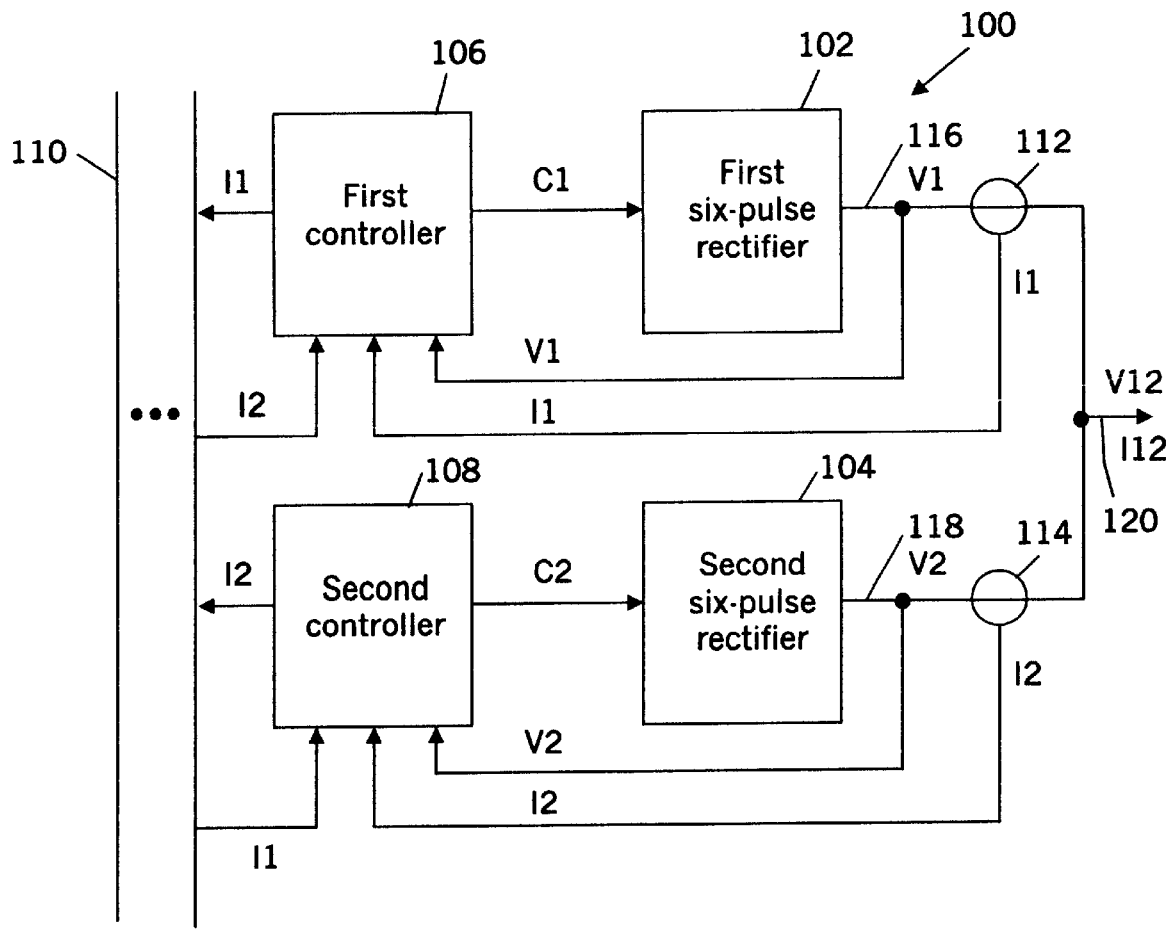
FIG. 1 is a block diagram of embodiments of twelve-pulse rectifiers according to the present invention.

Referring now to FIG. 1, a block diagram of embodiments of twelve-pulse rectifiers, according to the present invention, is shown. As shown in FIG. 1, a twelve-pulse rectifier 100 includes a first six-pulse rectifier 102 that produces a first six-pulse rectifier output voltage $V_1$ and a first output current $I_1$ at a first six-pulse rectifier output 116. A second six-pulse rectifier 104 produces a second six-pulse rectifier output voltage $V_2$ and a second six-pulse rectifier output current $I_2$ at a second six-pulse rectifier output 118. The first and second six-pulse rectifier outputs 116 and 118 are coupled together to provide a twelve-pulse rectifier output voltage $V_{12}$ and output current $I_{12}$ at a twelve-pulse rectifier output 120. The design and operation of the first and second six-pulse rectifiers 102 and 104 are well known to those having skill in the art and need not be described further herein.

Continuing with the description of FIG. 1, a first controller 106 controls the first six-pulse rectifier via a first control input $C_1$. A second controller 108 controls the second six-pulse rectifier 104 via a second control input $C_2$. It will be understood that these control inputs may be analog and/or digital. A data network 110 couples the first controller 106 to the second controller 108 to exchange data therebetween. The data network preferably is a Controller Area Network (CAN) such as is described in the *CAN Specification,* Version 2.0 published by Robert Bosch GmbH, 1991. However, it will be understood that other digital data networks may be used.

Overall operation of the first and second controllers 106 and 108 according to the present invention now will be described. More detailed operations also will be described below. It will be understood that the controllers may be analog controllers including digital interfaces to the data network 110, mixed analog and digital controllers or all digital controllers.

Preferably the first and second controllers 106 and 108 have a common architecture and more preferably they are identical. As shown in FIG. 1, they also preferably operate independently so that they are not in a master-slave relationship. Data exchange between the first and second controllers 106 and 108 preferably all takes place via the data network 110.

The first controller 106 preferably controls the first six-pulse rectifier 102 as a function of the output voltage $V_1$ and/or the output current $I_1$ at the first six-pulse rectifier output 116. The current $I_1$ may be obtained using a current probe 112 or other suitable technique. Similarly, the second controller 108 preferably controls the second six-pulse rectifier 104 as a function of the output voltage $V_2$ and/or output current $I_2$ at the second six-pulse rectifier output 118. The second current $I_2$ may be obtained by a second current probe 114 or other conventional technique. Thus, the first and second controllers 106 and 108, respectively, independently control the respective first and second six-pulse rectifiers 102 and 104.

However, as also shown in FIG. 1, the first controller also preferably controls the first six-pulse rectifier 102 as a function of the second current $I_2$ at the second six-pulse rectifier output 118, and the second controller 108 also preferably controls the second six-pulse rectifier 104 as a function of the first current $I_1$ at the first six-pulse rectifier output 116. As shown in FIG. 1, the first controller 106 preferably receives second data representing the second current $I_2$ at the second six-pulse rectifier output 118 via the data network 110, and the second controller 108 preferably receives first data representing the first current $I_1$ from the first six-pulse rectifier output 116 via the data network 110. It will be understood that the current values $I_1$ and $I_2$ may be provided to the data network 110 directly from the respective first and second outputs 116 and 118 via analog-to digital converters that are separate from or included in the controllers, or may be provided via the respective first and second controllers 106 and 108 as shown in FIG. 1.

Figure 2:
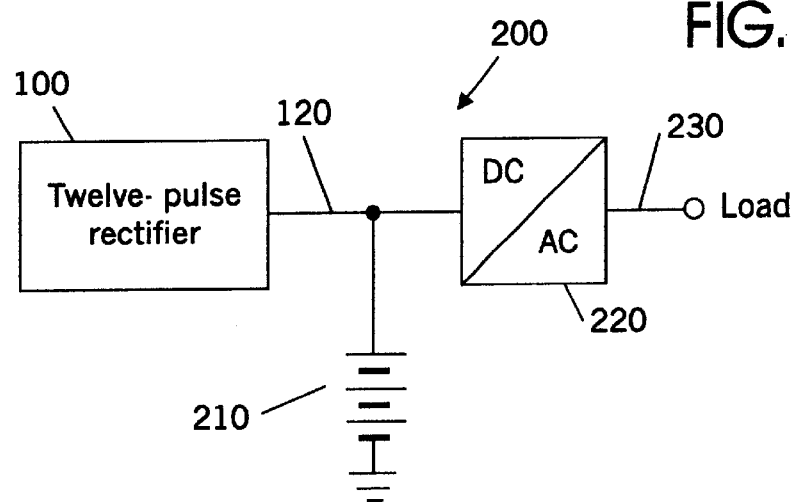
FIG. 2 is a block diagram illustrating use of twelve-pulse rectifiers according to the present invention in Uninterruptible Power Supplies (UPS).

FIG. 2 is a block diagram illustrating use of twelve-pulse rectifiers according to the present invention in an Uninterruptible Power Supply (UPS). As shown in FIG. 2, a UPS 200 can include a twelve-pulse rectifier 100 according to the present invention, the output 120 of which is coupled to a battery 210 and a DC-to-AC inverter 220 to provide an uninterruptible power supply to a load 230. The design and operation of UPS are well known to those having skill in the art and need not be described further herein.

Additional general discussion of conventional twelve-pulse rectifiers and twelve-pulse rectifiers according to the present invention now will be provided. Conventional twelve-pulse rectifiers generally use a single central controller. If the controller fails, the twelve-pulse rectifier generally becomes inoperative. For UPS applications, the UPS will start to draw power from the battery upon a rectifier failure, generally resulting in battery energy depletion and ultimately in load shut down.

Load sharing between two 30 degree out-of-phase transformers that are included in the twelve-pulse rectifier may be achieved with "droop control" that may result in loss of accuracy in the DC output. In UPS applications where a battery is connected to the DC output for battery float and equalization purposes, this can result in deviations from optimal battery voltage and can adversely impact the life and/or the reliability of the UPS.

In sharp contrast, as was described in FIG. 1, two controllers 106 and 108 that preferably are identical and independent, are connected by a high-speed data network 110 and share the load using a control algorithm, preferably a digital control algorithm, that is responsive to the network data. If one controller 106 or 108 fails, the other six-pulse rectifier 102 or 104 can assume the total load. Stated differently, the first controller 106 continues to control the first six-pulse rectifier 102 upon failure of the second controller 108 to thereby provide a first output current $I_1$ from or included in the first six-pulse rectifier 102 at the twelve-pulse rectifier output 120. Alternately, the second controller 108 continues to control the second six-pulse rectifier 104 upon failure of the first controller 106 to thereby provide the second output current $I_2$ from the second six-pulse rectifier 104 to the twelve-pulse rectifier output 120.

Since the failure of one controller can allow the load to be supported by the other controller, the system can be redundant for load capacity, depending on the load capacity of each individual six-pulse rectifier. The resulting system therefore may be more reliable. For example, in UPS applications of FIG. 2, it can be shown that the failure rate of the rectifier subsystem, assuming a worst case restoration rate of zero, may be reduced in half, or the mean time between failure can be doubled. In particular, assuming that $\lambda_1$ is the failure rate of a single central controller and $\lambda_2$ is the failure rate for the first or second controller 106 or 108, then the control system failure rate $\lambda_s$ may be defined as:

$$\lambda_S = \frac{2\lambda_2^2}{\mu + 3\lambda_2}$$

where $\mu$ is the restoration rate. For the worst case where $\mu$ is zero and $\lambda_2$ is 0.75 $\lambda_1$, then $\lambda_s$ equals 0.5 $\lambda_1$. The mean time between failure therefore becomes $2/\lambda_1$.

Figure 3:
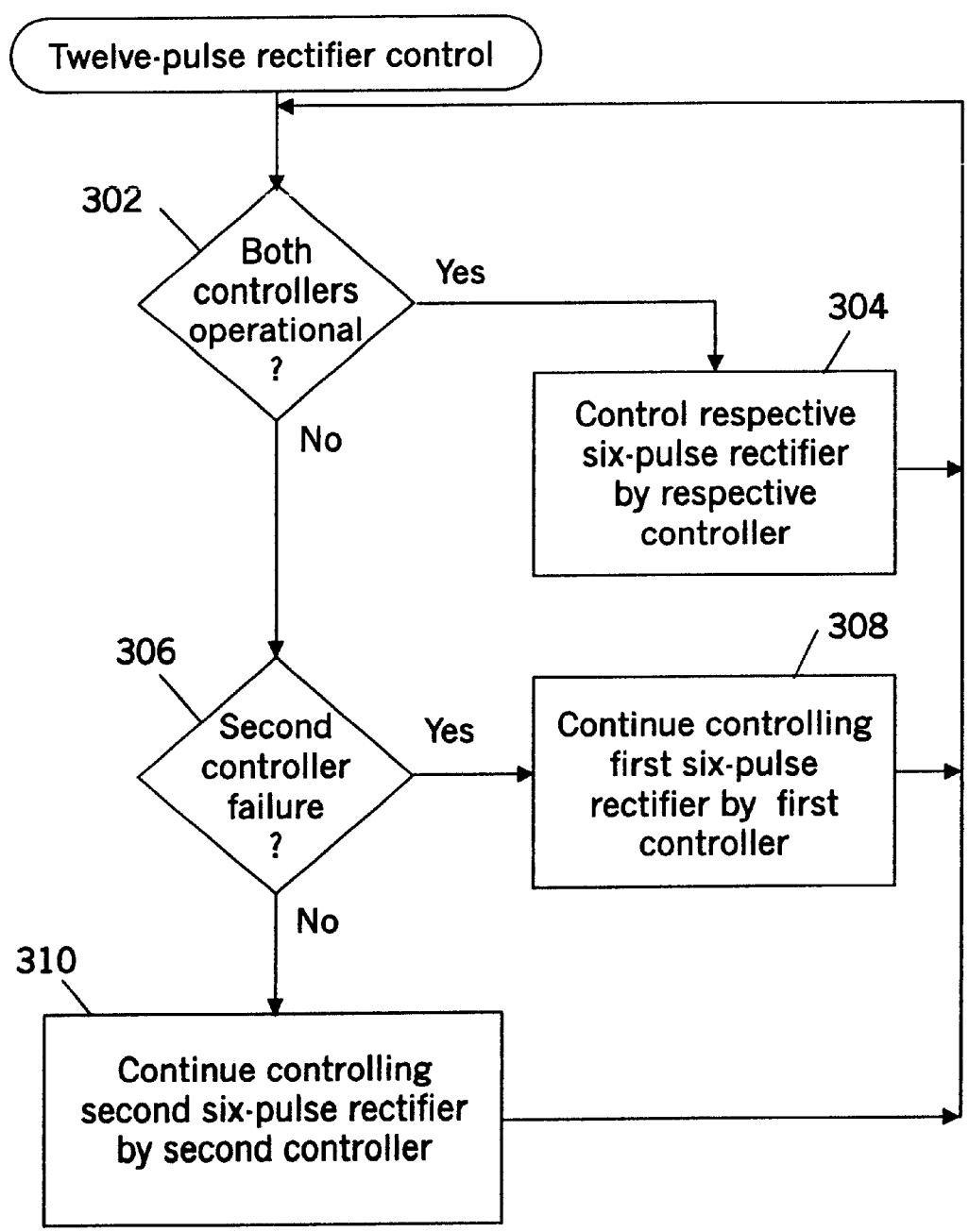
FIG. 3 is a flowchart illustrating twelve-pulse rectifier control according to the present invention.

FIG. 3 is a flowchart illustrating redundancy control of twelve-pulse rectifiers according to the present invention. As shown in FIG. 3, at Block 302, as long as both the first and second controllers 106 and 108 are operational, then at Block 304 the first and second six-pulse rectifiers 102 and 104, respectively, are controlled by the respective first and second controllers 106 and 108. However, at Block 306, if the second controller has a failure, then at Block 308 the first six-pulse rectifier 102 is continued to be controlled by the first controller 106 to thereby provide a first output current from the first six-pulse rectifier 102 at the twelve-pulse rectifier output 120. Alternatively, if the first controller has a failure, then at Block 310 the second six-pulse rectifier 104 is continued to be controlled by the second controller 108 to thereby provide a second output current from the second six-pulse rectifier 104 at the twelve-pulse rectifier output 120.

Figure 4:
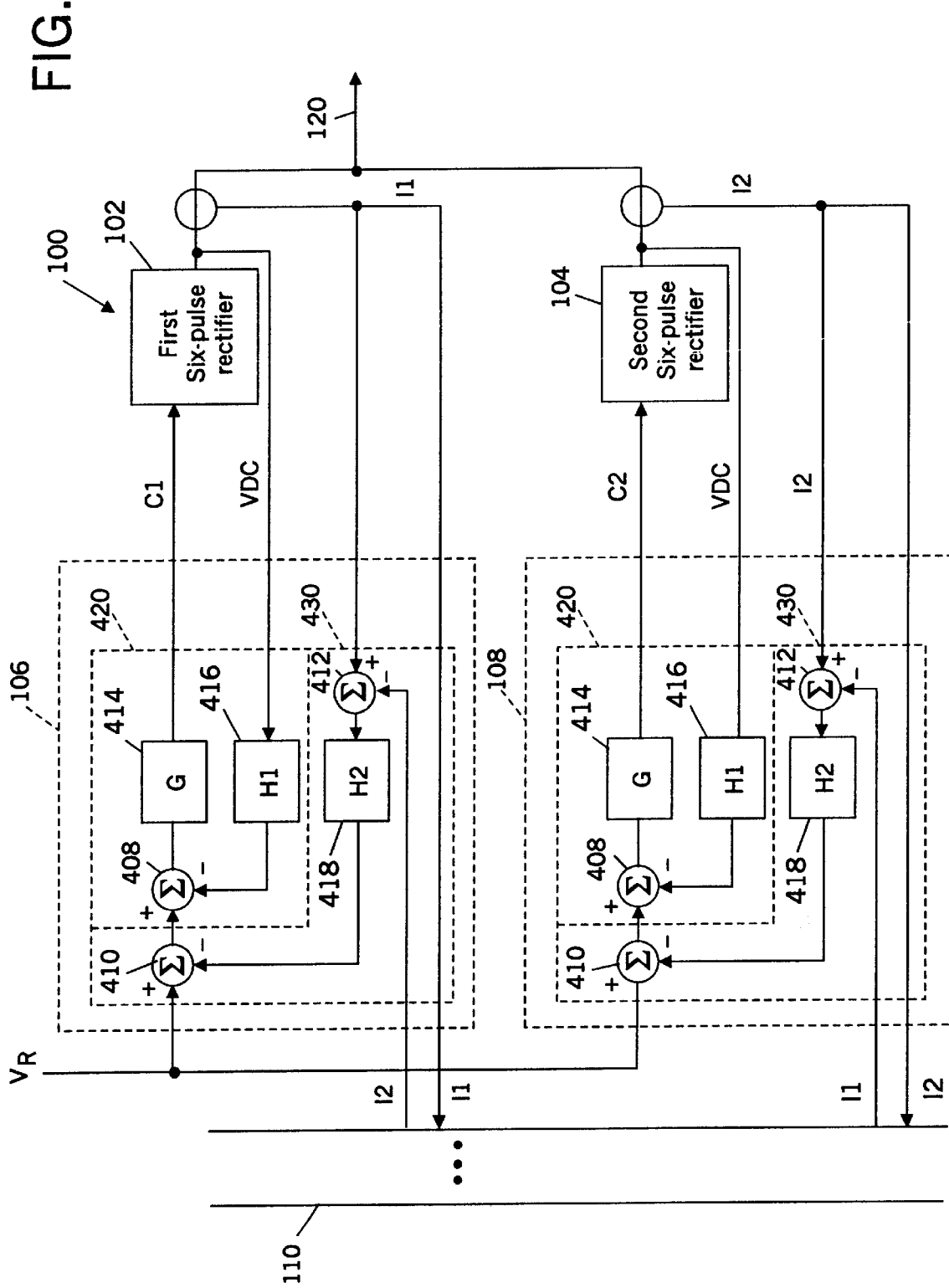
FIG. 4 is a block diagram of detailed embodiments of six-pulse rectifier controllers according to the present invention.

FIG. 4 is a block diagram illustrating details of an embodiment of the first and second controllers 106 and 108. As shown in FIG. 4, the first and second controllers 106 and 108 can have identical architecture. As also shown in FIG. 4, each controller can include a conventional first (inner) feedback loop 420 that controls the associated six-pulse rectifier independent of the other six-pulse rectifier output, and a second (outer) feedback loop 430 that controls the associated six-pulse rectifier as a function of the current at the other six-pulse rectifier output. More particularly, the first feedback group 420 includes a forward loop gain G, 414, a feedback loop gain $H_1$, 416, and a first summing node 408. The first feedback loop is responsive to an output voltage reference setpoint $V_R$. As shown, the control input $C_1$ or $C_2$ is a function of the DC voltage, labeled $V_{DC}$, at the output of the associated six-pulse rectifier. The control input also may be a function of the current of the output of the associated six-pulse rectifier. Conventional proportional-integral-derivative (PID) control may be used to provide the first feedback loop 420, using analog, analog/digital or digital control algorithms.

Still referring to FIG. 4, a separate second feedback loop 430 having a second feedback loop gain $H_2$, 418, and summing nodes 410 and 412, controls the associated six-pulse rectifier as a function of current at the other six-pulse rectifier output. Conventional PI control may be used to provide the second feedback loop 430 using analog, analog/digital or digital control algorithms. It will be understood by those having skill in the art that each of the first and second controllers 106 may be embodied using hardware, software or combinations thereof. Implementation of feedback control loops is well known to those having skill in the art and need not be described in further detail herein.

Preferably, the first feedback loop 420 is faster in operation than the second feedback loop 430 so that each controller controls its associated six-pulse rectifier using the output current and/or voltage of the associated six-pulse rectifier more rapidly than it controls the associated six-pulse rectifier using the output current of the other six-pulse rectifier. However, synchronous operation also may be provided. It also will be understood that the current value from the other six-pulse rectifier may be averaged, delayed, scaled and/or otherwise processed to provide an input to the other controller via the data network 110.

Accordingly, load sharing between the two six-pulse rectifiers 102 and 104 may be realized using a second (outer) digital control loop can correct the set point voltage so that each six-pulse rectifier preferably carries 50% of the total load. Thus, each outer feedback loop 420 preferably drives the difference between the currents that are output by the first and second pulse rectifiers to zero, to thereby allow a high degree of regulation. In general, the closer the load carried by each rectifier is to 50%, the better harmonic reduction may be achieved. Controllers according to the present invention can achieve more than 1% and preferably more than 0.1% accuracy in load sharing. It also will be understood that the data network 110 also may carry other information that is broadcast by the first and second controllers 106 and 108, including, but not limited to, output current and voltage information and operational failure signals.

As will be appreciated by one of skill in the art, the first and second controllers 106 and 108 may be embodied in an entirely hardware embodiment or an embodiment combining software and hardware aspects. Moreover, the block diagrams and/or flowchart illustrations described above support controllers and methods of operating controllers according to embodiments of the invention. Finally, a block or blocks of the block diagrams and/or flowchart illustrations can be implemented by computer program instructions. These computer program instructions may be provided to a processor of a general purpose controller, special purpose controller, or other programmable data processing apparatus to produce a machine, such that the instructions which execute via the processor of the computer or other programmable data processing apparatus, create means for implementing the functions specified in the block diagram and/or flowchart block or blocks. Computer program instructions may also be loaded onto a controller or other programmable data processing apparatus to cause a series of operational steps to be performed on the controller or other programmable apparatus to produce a computer implemented process such that the instructions which execute on the controller or other programmable apparatus provide steps for implementing the functions specified in the block diagrams and/or flowchart block or blocks.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A twelve-pulse rectifier comprising:
    a first six-pulse rectifier including a first six-pulse rectifier output;
    a second six-pulse rectifier including a second six-pulse rectifier output, the first and second six-pulse rectifier outputs being coupled together to provide a twelve-pulse rectifier output;
    a first controller that controls the first six-pulse rectifier;
    a second controller that controls the second six-pulse rectifier; and
    a data network that couples the first controller and the second controller to transmit signals from the first controller to the second controller and from the second controller to the first controller.

2. A twelve-pulse rectifier according to claim 1 wherein the first controller controls the first six-pulse rectifier as a function of a first voltage at the first six-pulse rectifier output, a first current at the first six-pulse rectifier output and a second current at the second six-pulse rectifier output and wherein the second controller controls the second six-pulse rectifier as a function of a second voltage at the second six-pulse rectifier output, the second current at the second six-pulse rectifier output and the first current at the first six-pulse rectifier output.

3. A twelve-pulse rectifier according to claim 2 wherein the first controller receives second data representing the second current at the second six-pulse rectifier output via the data network and wherein the second controller receives first data representing the first current at the first six-pulse rectifier output via the data network.

4. A twelve-pulse rectifier according to claim 1 wherein the first and second controllers have a common architecture and are not arranged in a master-slave relationship.

5. A twelve-pulse rectifier according to claim 2:
    wherein the first controller comprises a first feedback loop that controls the first six-pulse rectifier as a function of the first voltage and independent of the second six-pulse rectifier output, and a second feedback loop that also controls the first six-pulse rectifier as a function of the second current at the second six-pulse rectifier output; and
    wherein the second controller comprises a first feedback loop that controls the second six-pulse rectifier as a function of the second voltage and independent of the first six-pulse rectifier output, and a second feedback loop that also controls the second six-pulse rectifier as a function of current at the first six-pulse rectifier output.

6. A twelve-pulse rectifier according to claim 1 wherein the data network is a Controller Area Network (CAN).

7. A twelve-pulse rectifier according to claim 1 wherein the data network couples the first controller and the second controller such that first data representing current at the first six-pulse rectifier output is provided to the second controller over the data network and second data representing current at the second six-pulse rectifier output is provided to the first controller over the data network.

8. A twelve-pulse rectifier according to claim 1 further comprising a battery and a DC-to-AC inverter that are coupled to the twelve-pulse rectifier output to provide an uninterruptible power supply.

9. A twelve-pulse rectifier according to claim 1:
    wherein the first controller continues to control the first six-pulse rectifier upon failure of the second controller to thereby provide a first output current from the first six-pulse rectifier at the twelve-pulse rectifier output; and
    wherein the second controller continues to control the second six-pulse rectifier upon failure of the first controller to thereby provide a second output current from the second six-pulse rectifier at the twelve-pulse rectifier output.

10. A twelve-pulse rectifier comprising:
    a first six-pulse rectifier including a first six-pulse rectifier output;
    a second six-pulse rectifier including a second six-pulse rectifier output, the first and second six-pulse rectifier outputs being coupled together to provide a twelve-pulse rectifier output;
    a first controller that controls the first six-pulse rectifier; and
    a second controller that is separate from the first controller and that controls the second six-pulse rectifier, wherein the first and second controllers do not operate in a master-slave relationship.

11. A twelve-pulse rectifier according to claim 10 wherein the first controller controls the first six-pulse rectifier as a function of a first voltage at the first six-pulse rectifier output, a first current at the first six-pulse rectifier output and a second current at the second six-pulse rectifier output and wherein the second controller controls the second six-pulse rectifier as a function of a second voltage at the second six-pulse rectifier output, the second current at the second six-pulse rectifier output and the first current at the first six-pulse rectifier output.

12. A twelve-pulse rectifier according to claim 10 wherein the first and second controllers have a common architecture.

13. A twelve-pulse rectifier according to claim 11:
wherein the first controller comprises a first feedback loop that controls the first six-pulse rectifier as a function of the first voltage and independent of the second six-pulse rectifier output, and a second feedback loop that also controls the first six-pulse rectifier as a function of the second current at the second six-pulse rectifier output; and
wherein the second controller comprises a first feedback loop that controls the second six-pulse rectifier as a function of the second voltage and independent of the first six-pulse rectifier output, and a second feedback loop that also controls the second six-pulse rectifier as a function of current at the first six-pulse rectifier output.

14. A twelve-pulse rectifier according to claim 10 further comprising a battery and a DC-to-AC inverter that are coupled to the twelve-pulse rectifier output to provide an uninterruptible power supply.

15. A twelve-pulse rectifier according to claim 10:
wherein the first controller continues to control the first six-pulse rectifier upon failure of the second controller to thereby provide a first output current from the first six-pulse rectifier at the twelve-pulse rectifier output; and
wherein the second controller continues to control the second six-pulse rectifier upon failure of the first controller to thereby provide a second output current from the second six-pulse rectifier at the twelve-pulse rectifier output.

16. A method of controlling a twelve-pulse rectifier including a first six-pulse rectifier that is controlled by a first controller and a second six-pulse rectifier that is controlled by a second controller, wherein the first and second six-pulse rectifiers are coupled together to provide a twelve-pulse rectifier output, the controlling method comprising:
controlling the first and second six-pulse rectifiers by the respective first and second controllers in a non-master-slave relationship when the first and second controllers are operational;
continuing controlling the first six-pulse rectifier by the first controller upon failure of the second controller to thereby provide a first output current from the first six-pulse rectifier at the twelve-pulse rectifier output; and
continuing controlling the second six-pulse rectifier by the second controller upon failure of the first controller to thereby provide a second output current from the second six-pulse rectifier at the twelve-pulse rectifier output.

17. A method according to claim 16 wherein the controlling step comprises the steps of:
controlling the first six-pulse rectifier by the first controller as a function of a first voltage at an output of the first six-pulse rectifier, a first current at the output of the first six-pulse rectifier and a second current at an output of the second six-pulse rectifier output; and
controlling the second six-pulse rectifier by the second controller as a function of a second voltage at the output of the second six-pulse rectifier, the second current at the output of the second six-pulse rectifier and the first current at the output of the first six-pulse rectifier.

18. A method according to claim 16 further comprising the step of converting the twelve-pulse rectifier output into alternating current.

19. A method of controlling a twelve-pulse rectifier including a first six-pulse rectifier that is controlled by a first controller and a second six-pulse rectifier that is controlled by a second controller, wherein the first and second six-pulse rectifiers are coupled together to provide a twelve-pulse rectifier output, the controlling method comprising:
controlling the first and second six-pulse rectifiers by the respective first and second controllers in a non-master-slave relationship; and
exchanging data between the first and second controllers via a data network by transmitting signals from the first controller to the second controller and from the second controller to the first controller.

20. A method according to claim 19:
wherein the controlling step comprises the steps of controlling the first six-pulse rectifier by the first controller as a function of a first voltage at an output of the first six-pulse rectifier, a first current at the first six-pulse rectifier output and a second current at an output of the second six-pulse rectifier and controlling the second six-pulse rectifier by the second controller as a function of a second voltage at the output of the second six-pulse rectifier, the second current at the second six-pulse rectifier output and the first current at the output of the first six-pulse rectifier; and
wherein the exchanging step comprises the steps of providing first data representing the first current at the output of the first six-pulse rectifier to the second controller via the data network and providing second data representing the second current at the output of the second six-pulse rectifier to the first controller via the data network.

21. A method according to claim 19 further comprising the step of converting the twelve-pulse rectifier output into alternating current.

22. A method according to claim 19 further comprising the steps of:
continuing to control the first six-pulse rectifier by the first controller upon failure of the second controller to thereby provide a first output current from the first six-pulse rectifier at the twelve-pulse rectifier output; and
continuing to control the second six-pulse rectifier by the second controller upon failure of the first controller to thereby provide a second output current from the second six-pulse rectifier at the twelve-pulse rectifier output.

23. A method of controlling a twelve-pulse rectifier including a first six-pulse rectifier and a second six-pulse rectifier, wherein the first and second six-pulse rectifiers are coupled together to provide a twelve-pulse rectifier output, the controlling method comprising:
controlling the respective first and second six-pulse rectifiers by respective first and second controllers that are separate from one another and that operate in a non-master-slave relationship.

24. A method according to claim 23 further comprising the steps of:
continuing to control the first six-pulse rectifier by the first controller upon failure of the second controller to thereby provide a first output current from the first six-pulse rectifier at the twelve-pulse rectifier output; and continuing to control the second six-pulse rectifier by the second controller upon failure of the first controller to thereby provide a second output current from the second six-pulse rectifier at the twelve-pulse rectifier output.

25. A method according to claim 23 wherein the controlling step comprises the steps of:

controlling the first six-pulse rectifier by the first controller as a function of a first voltage at an output of the first six-pulse rectifier, a first current at the output of the first six-pulse rectifier and a second current at an output of the second six-pulse rectifier; and controlling the second six-pulse rectifier by the second controller as a function of a second voltage at the output of the second six-pulse rectifier, the second current at the output of the second six-pulse rectifier and a first current at the output of the first six-pulse rectifier.

26. A method according to claim 23 further comprising the step of converting the twelve-pulse rectifier output into alternating current.

27. A rectifier system comprising:

a first rectifier including a first rectifier output;

a second rectifier including a second rectifier output, the first and second rectifier outputs being coupled together to provide a rectifier system output;

a first controller that controls the first rectifier;

a second controller that controls the second rectifier; and a data network that couples the first controller and the second controller to transmit signals from the first controller to the second controller and from the second controller to the first controller.

28. A rectifier system according to claim 27 wherein the first controller controls the first rectifier as a function of a first voltage at the first rectifier output, a first current at the first rectifier output and a second current at the second rectifier output and wherein the second controller controls the second rectifier as a function of a second voltage at the second rectifier, output the second current at the second rectifier output and the first current at the first rectifier output.

29. A rectifier system according to claim 28 wherein the first controller receives second data representing the second current at the second rectifier output via the data network and wherein the second controller receives first data representing the first current at the first rectifier output via the data network.

30. A rectifier system according to claim 27 wherein the first and second controllers have a common architecture and are not arranged in a master-slave relationship.

31. A rectifier system according to claim 28:

wherein the first controller comprises a first feedback loop that controls the first rectifier as a function of the first voltage and independent of the second rectifier output, and a second feedback loop that also controls the first rectifier as a function of the second current at the second rectifier output; and wherein the second controller comprises a first feedback loop that controls the second rectifier as a function of the second voltage and independent of the first rectifier output, and a second feedback loop that also controls the second rectifier as a function of current at the first rectifier output.

32. A rectifier system according to claim 27 wherein the data network is a Controller Area Network (CAN).

33. A rectifier system according to claim 27 wherein the data network couples the first controller and the second controller such that first data representing current at the first rectifier output is provided to the second controller over the data network and second data representing current at the second rectifier output is provided to the first controller over the data network.

34. A rectifier system according to claim 27 further comprising a battery and a DC-to-AC inverter that are coupled to the rectifier output to provide an uninterruptible power supply.

35. A rectifier system according to claim 27:

wherein the first controller continues to control the first rectifier upon failure of the second controller to thereby provide a first output current from the first rectifier at the rectifier output; and wherein the second controller continues to control the second rectifier upon failure of the first controller to thereby provide a second output current from the second rectifier at the rectifier output.

36. A rectifier system comprising:

a first rectifier including a first rectifier output;

a second rectifier including a second rectifier output, the first and second rectifier outputs being coupled together to provide a rectifier system output;

a first controller that controls the first rectifier; and a second controller that is separate from the first controller and that controls the second rectifier, wherein the first and second controllers do not operate in a master-slave relationship.

37. A rectifier system according to claim 36 wherein the first controller controls the first rectifier as a function of a first voltage at the first rectifier output, a first current at the first rectifier output and a second current at the second rectifier output and wherein the second controller controls the second rectifier as a function of a second voltage at the second rectifier output, the second current at the second rectifier output and the first current at the first rectifier output.

38. A rectifier system according to claim 36 wherein the first and second controllers have a common architecture.

39. A rectifier system according to claim 37:

wherein the first controller comprises a first feedback loop that controls the first rectifier as a function of the first voltage and independent of the second rectifier output, and a second feedback loop that also controls the first rectifier as a function of the second current at the second rectifier output; and wherein the second controller comprises a first feedback loop that controls the second rectifier as a function of the second voltage and independent of the first rectifier output, and a second feedback loop that also controls the second rectifier as a function of current at the first rectifier output.

40. A rectifier system according to claim 36 further comprising a battery and a DC-to-AC inverter that are coupled to the rectifier output to provide an uninterruptible power supply.

41. A rectifier system according to claim 36:

wherein the first controller continues to control the first rectifier upon failure of the second controller to thereby provide a first output current from the first rectifier at the rectifier system output; and wherein the second controller continues to control the second rectifier upon failure of the first controller to thereby provide a second output current from the second rectifier at the rectifier system output.

* * * * *